(12) United States Patent
Johnson et al.

(10) Patent No.: US 9,667,628 B2
(45) Date of Patent: May 30, 2017

(54) SYSTEM FOR ESTABLISHING OWNERSHIP OF A SECURE WORKSPACE

(71) Applicant: Intel Corporation, Santa Clara, CA (US)

(72) Inventors: Simon P. Johnson, Beaverton, OR (US); Asher M. Altman, Bedford, MA (US); Abhishek Das, Portland, OR (US); Vincent R. Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/534,305

(22) Filed: Nov. 6, 2014

(65) Prior Publication Data

US 2016/0134627 A1    May 12, 2016

(51) Int. Cl.
| | |
|---|---|
| *H04L 29/06* | (2006.01) |
| *G06F 21/51* | (2013.01) |
| *G06F 21/53* | (2013.01) |
| *G06F 21/60* | (2013.01) |

(52) U.S. Cl.
CPC .......... *H04L 63/0876* (2013.01); *G06F 21/51* (2013.01); *G06F 21/53* (2013.01);
(Continued)

(58) Field of Classification Search
CPC ..... H04L 63/0876; H04L 63/08; G06F 21/53; G06F 21/60
See application file for complete search history.

(56) References Cited

U.S. PATENT DOCUMENTS

| | | | |
|---|---|---|---|
| 8,880,889 B1 * | 11/2014 | Ward | H04L 63/0442 |
| | | | 705/67 |
| 2007/0094719 A1 * | 4/2007 | Scarlata | G06F 21/53 |
| | | | 726/9 |

(Continued)

OTHER PUBLICATIONS

McKeen, Frank, Ilya Alexandrovich, Alex Berenzon, Carlos V. Rozas, Hisham Shafi, Vedvyas Shanbhogue, and Uday R. Savagaonkar. "Innovative Instructions and Software Model for Isolated Execution." Innovative Instructions and Software Model for Isolated Execution. Intel Corporation, Aug. 14, 2013. Web. Dec. 2, 2015.*

(Continued)

*Primary Examiner* — Eleni Shiferaw
*Assistant Examiner* — Alexander Lapian
(74) *Attorney, Agent, or Firm* — Grossman, Tucker, Perreault & Pfleger, PLLC

(57) ABSTRACT

The present application is directed to establishing ownership of a secure workspace (SW). A client device may provide a SW data structure (SWDS) to a SW configurator. A SWDS may comprise a hash of an original SW and a public key, and may be signed by a private key corresponding to the public key. The SW configurator may cause an execution container (EC) to be generated including a SW initiated using the SWDS. The client device may claim SW ownership using a request (signed by the private key) transmitted along with a copy of the public key. SW ownership may be determined by an ownership determination module that verifies the signature of the request using the public key received with the request, determines a hash of the received public key and compares the hash of the received public key to a hash of the public key in the SWDS.

10 Claims, 5 Drawing Sheets

(52) U.S. Cl.
CPC ............ *H04L 63/061* (2013.01); *H04L 63/08* (2013.01); *G06F 21/60* (2013.01)

(56) References Cited

U.S. PATENT DOCUMENTS

| | | | |
|---|---|---|---|
| 2009/0169017 A1* | 7/2009 | Smith | G06F 21/57 380/278 |
| 2009/0279699 A1 | 11/2009 | Noda | |
| 2012/0297200 A1* | 11/2012 | Thom | G06F 21/57 713/189 |
| 2013/0036103 A1 | 2/2013 | Lawson et al. | |
| 2013/0159726 A1* | 6/2013 | McKeen | G06F 21/72 713/189 |
| 2013/0191823 A1* | 7/2013 | Davidson | H04L 67/34 717/178 |
| 2013/0283056 A1 | 10/2013 | Lin et al. | |
| 2014/0173700 A1* | 6/2014 | Awan | H04L 63/107 726/4 |
| 2014/0317417 A1 | 10/2014 | Ashkenazi et al. | |
| 2015/0304736 A1* | 10/2015 | Lal | G06F 21/10 380/210 |

OTHER PUBLICATIONS

Intel Developer Zone, Instruction Set Architecture (ISA) Extensions, Software Guard Extensions (Intel SGX). Printed Apr. 8, 2015. https://software.intel.com/en-us/isa-extensions/intel-sgx. 4 pages.
International Search Report and Written Opinion from related application PCT/US2015/054186 mailed Jan. 22, 2016.
Ittai Anati et al., 'Innovative Technology for CPU Based Attestation and Sealing', Intel Developer Zone, Aug. 14, 2013.

* cited by examiner

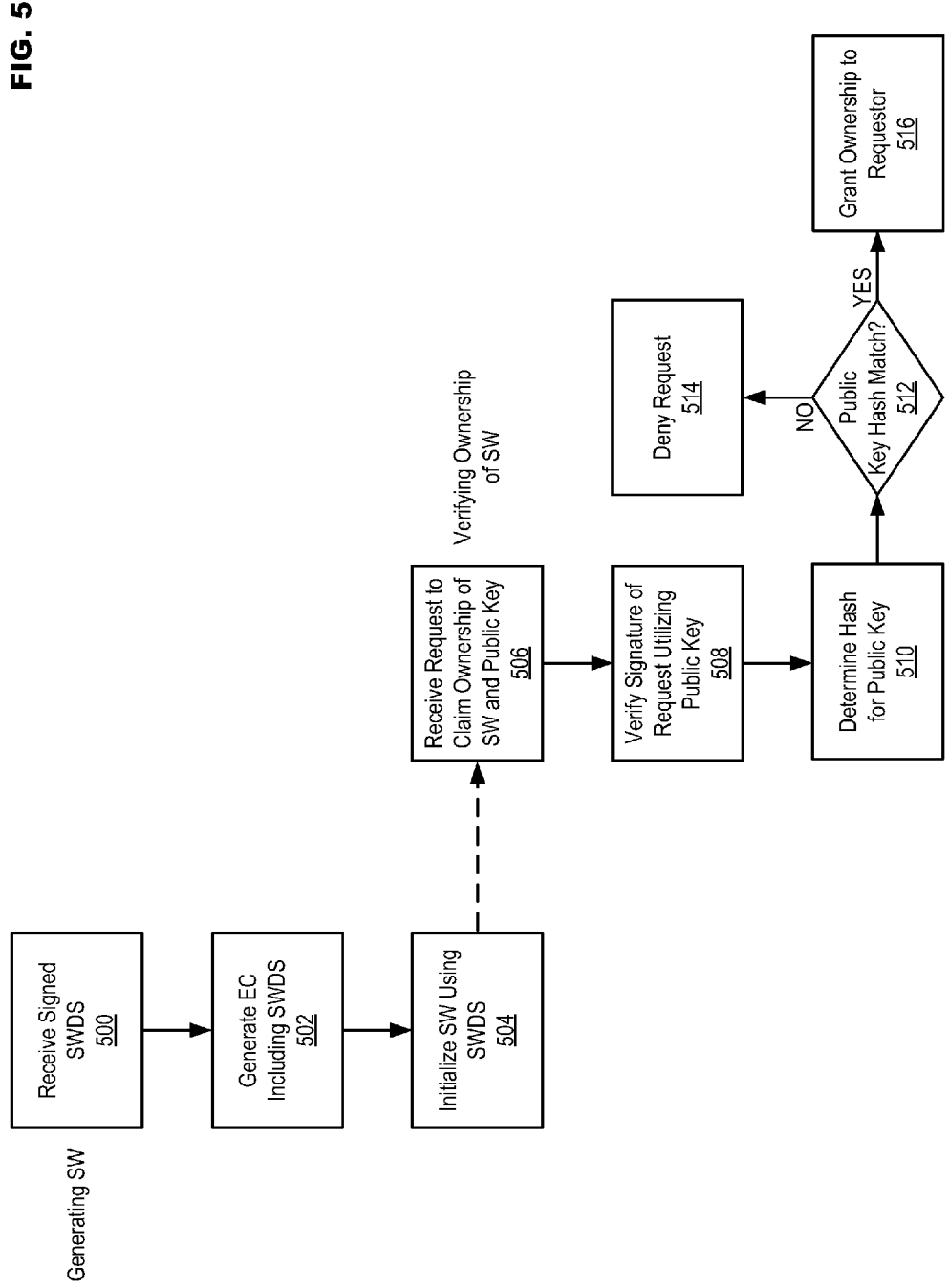

SYSTEM FOR ESTABLISHING OWNERSHIP OF A SECURE WORKSPACE

TECHNICAL FIELD

The present disclosure relates to system security, and more particularly, to a system that allows a device to establish ownership of a secured workspace situated in a remote resource.

BACKGROUND

Safeguarding electronic information has become an important issue based on the growing variety of transactions that may now be conducted electronically. Various threats including, for example, hackers, malicious software (e.g., malware) such as viruses, rootkits, etc. may share at least one purpose: to circumvent existing protection measures to gain access to, or control over, another users' device. A user employing a device to perform daily transactions may be unaware that their device has been compromised, and may be unknowingly providing sensitive personal, financial and/or proprietary data to a third party. Technology is continually being developed to combat these types of attacks. However, as new virus protections strategies emerge, hackers are finding ways to attack at lower levels within a device, gaining access and/or control at a level in the device having higher priority than the protection software. As a result, device manufacturers are building security measures into the actual hardware of a device. For example, these security features may be enabled an early stage of device initialization, and may ensure that programs loaded later are safe by performing a security check as the programs are loaded into the device.

For example, during initialization a device may reserve a portion of memory that may be accessible only to known-good programs. In this manner, sensitive and/or confidential data that is stored in the portion of memory may be protected from attack. However, a scenario may exist wherein known-good software does not reside in the same device as the protected memory. For example, a known-good program (e.g., a "client" program) in a user device may need to access a portion of protected memory situated in at least one remote computing device (e.g., operating in a cloud architecture). While it may be desirable for a client program to be capable of accessing protected memory that resides in at least one other device, the protected memory may be secured from being accessed by any software other that an "owner" of the protected memory that may be assigned, for example, when the protected portion of memory is first created. This requirement may severely limit the applications to which this type of security technology may be applied.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5 illustrates example operations for establishing ownership of a secure workspace from the perspective of a remote resource in accordance with at least one embodiment of the present disclosure.

Figure 1:
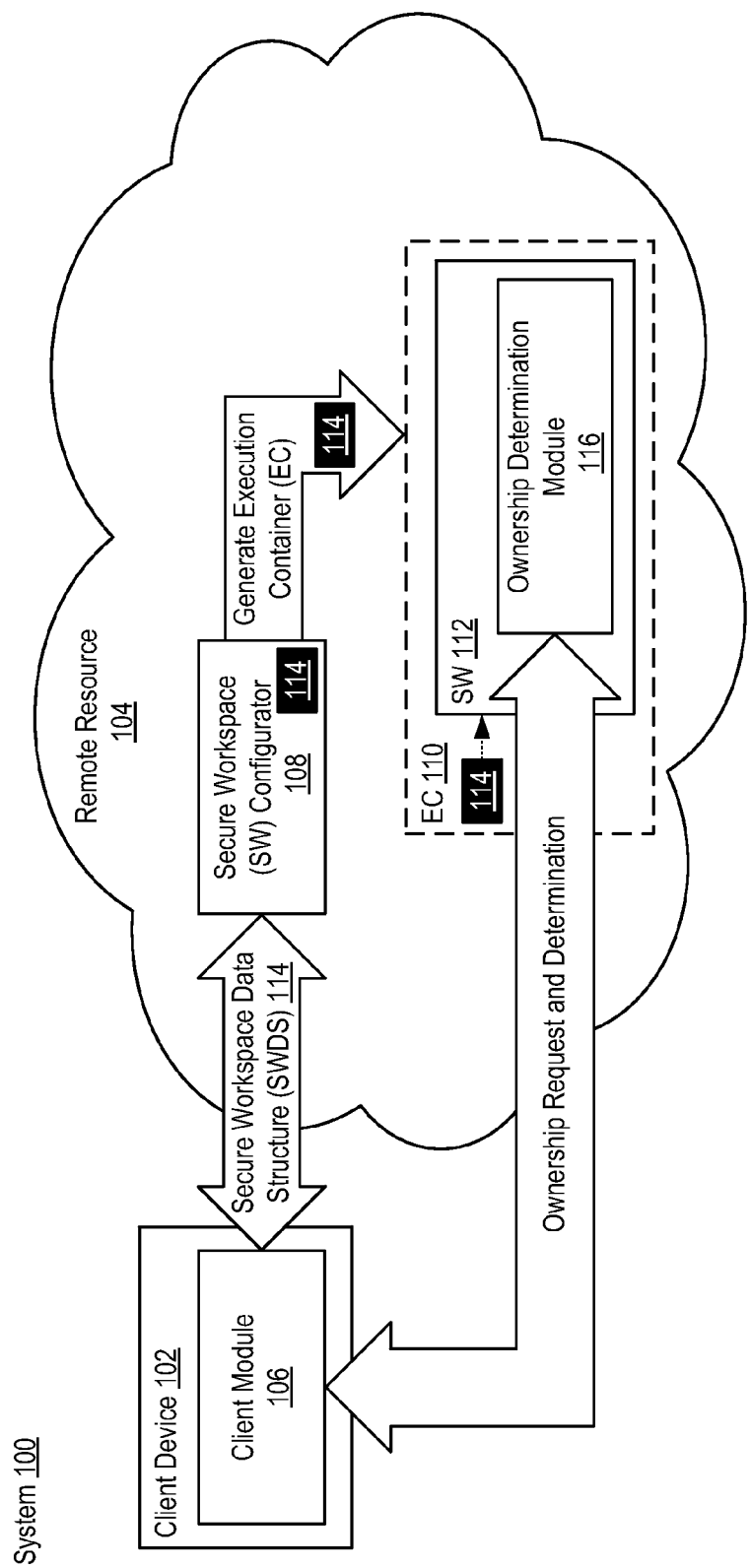
FIG. 1 illustrates an example system for establishing ownership of a secure workspace in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to establishing ownership of a secure workspace (SW). In at least one embodiment, a client device may provide a SW data structure (SWDS) to a SW configurator situated in a remote resource. An example SWDS may comprise a hash of an original SW and a public key, and may be signed using a private key corresponding to the public key. The SW configurator may then cause an execution container (EC) to be generated including a SW based on the SWDS. The client device may later claim ownership of the SW by transmitting a request to the remote resource. The request may be signed by the private key, and may be transmitted along with a copy of the public key. An ownership determination module in the SW may then determine whether the client device owns the SW by, for example, verifying the signature of the request using the public key received with the request, determining a hash of the public key received with the request and then comparing the hash of the public key received with the request to a hash of the public key received in the SWDS. If the hashes of the public keys are determined to match, the client device may be allowed to claim ownership of the SW.

In at least one embodiment, at least one device may comprise, for example, a communication module and a SW configurator. The communication module may be to interact with at least a client device. The SW configurator may initially be to receive a SWDS from the client device. The SW configurator may then be to cause a SW to be included within an EC generated by the remote resource, the SW being based on the SWDS.

An example SWDS may comprise data pertaining to the SW and a public key, the SWDS being received in a message signed with a private key corresponding to the public key. The data pertaining to the SW may comprise a hash value measured from the SW. The EC may further be to initialize the SW based on the SWDS, initialization of the SW including measuring a hash value of the public key in the secure workspace data structure.

In at least one embodiment, the SW may further comprise an ownership determination module to receive a signed message including at least a request to take ownership of the SW and the public key from the client device via the communication module and determine whether the client device is authorized to take ownership of the SW based at least on the signed message and the SWDS. The ownership determination module being to determine whether the client device is authorized to take ownership of the SW may comprise the ownership determination module being to verify the signature of the signed message utilizing the public key received with the signed message, determine a hash value for the public key received with the signed message by measuring the public key, verify ownership of the SW by comparing the hash of the public key received with the signed message to the hash of the public key determined when the SW was initialized and grant ownership of the SW to the client device if the hash of the public key received with the signed message matches the hash of the public key determined when the SW was initialized. In at least one embodiment, the SW is a secure enclave based on Software Guard Extensions (SGX) technology and the SWDS is an SGX SIGSTRUCT data structure.

A client device consistent with the present disclosure may comprise, for example, a communication module and a client module. The communication module may be to interact with at least a remote resource. The client module may be to determine a hash value of a SW by measuring an original version of the SW to be used for generating new SWs, generate a public key and a corresponding private key, place at least the hash value and the public key into a SWDS, and transmit the SWDS to the remote resource. The hash value of the SW may be received from, for example, a secure workplace configurator in the remote resource. The client module may be further to generate a message comprising a request to take ownership of a SW, sign the message with the private key and transmit the signed message and the public key to the remote resource. In at least one embodiment, the SW is a secure enclave based on SGX technology and the SWDS is a SGX SIGSTRUCT data structure. A method for establishing ownership of a SW consistent with the present disclosure may comprise, for example, receiving a SWDS at a SW configurator from a client device, the SW configurator residing in a remote resource and causing a SW to be included within an EC generated by the remote resource, the SW being based on the SWDS.

FIG. 1 illustrates an example system for establishing ownership of a secure workspace in accordance with at least one embodiment of the present disclosure. System 100 may comprise, for example, at least client device 102 and remote resource 104. Examples of client device 102 may comprise, but are not limited to, a mobile communication device such as a cellular handset or smartphone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a smart television, small form factor computing solutions (e.g., for space-limited applications, TV set-top boxes, etc.) like the Next Unit of Computing (NUC) platform from the Intel Corporation, etc. Remote resource 104 may comprise at least one computing device accessible to client device 102 via a network connection. Example networks may include, but are not limited to, a local-area network (LAN), a wide-area network (WAN) like the Internet, a global-area network (GAN), etc. In at least one embodiment, remote resource 104 may comprise at least one data server operating as part of a cloud computing architecture. A cloud computing architecture may comprise, for example, a plurality of data servers operating individually or in unison to provide various data processing-related services to client device 102.

Client device 102 may comprise, for example, at least client module 106. Client module 106 may include equipment and/or software that may be configured to access SW 112. "Access" as referenced herein may include storing data in SW 112, reading data from SW 112, executing programs loaded in SW 112, etc. For the sake of explanation, an example of a real-world usage consistent with the present disclosure may comprise client device 102 being a smart phone and client module 106 being an application that provides a user interface to access a user's personal financial accounts, wherein information needed to access the financial accounts (e.g., account numbers, usernames, passwords, etc.) may be stored in remote resource 104 to protect against client device 102 becoming lost, stolen or otherwise compromised. While this example solution may protect against readily apparent vulnerabilities in client device 102, the access information may likewise be vulnerable to attack when stored in remote resource 104, especially given that remote resource 104 may a repository for access information corresponding to a large number of users (e.g., any user utilizing client module 106), and thus, may be an attractive target to attack. Thus, it may be beneficial to further protect the information stored in remote resource 104 in a manner that may provide high level security that only client module 106 may be able to access.

Remote resource 104 may comprise, for example, at least SW configurator 108 that may be to cause EC 110 to include at least SW 112 configured based on SWDS 114. As referenced herein, EC 110 may generally comprise a software-based construct that may be able to emulate the operation of a similarly-configured hardware-based data processing device. Examples of EC 110 may include, but are not limited to, a virtual machine (VM) such as commonly associated with Virtualization Technology (VT) from the Intel Corporation, a Docker Engine as developed by the Docker Corporation, a Linux Kernel-based Virtual Machine (KVM), etc. In at least one embodiment, SW configurator 108 may comprise equipment and/or software for storing SWDS 114 received from client device 102, and for causing EC 110 to be generated including at least SWDS 114 that may be used by EC 110 to generate SW 112. SW 112 may be, for example, a trusted execution environment (TEE) in which known-good programs may execute, confidential information may be stored in a secure manner, etc. In general, SW 112 may comprise a set of computing resources that are secure such that programs executing within SW 112, and any data associated with the executing programs, are isolated. Outside actors cannot be interfere with or observe the programs/data within SW 112 during program execution with the exception that the program may be started or stopped and the associated data may be inserted or deleted. Any data leaving SW 112 may be released in a controlled manner. Consistent with the present disclosure, at least one known-good program executing within SW 112 may perform any or all operations disclosed herein in regard to SW 112. In one example implementation, SW 112 may employ Software Guard Extensions (SGX) technology developed by the Intel Corporation. SGX may provide a secure and hardware-encrypted computation and storage area within system memory, the contents of which cannot be deciphered by privileged code or even through the application of hardware probes to memory bus. When SW 112 is protected by SGX, embodiments consistent with the present disclosure make it impossible for intruders to decipher the contents of SW 112. Protected data cannot be observed outside of SGX, and thus, is inaccessible outside of SGX.

In an example implementation wherein SW 112 is implemented using SGX, the identity of programs (e.g., based on a cryptographic hash measurement of each program's contents) may be signed and stored inside each program. When the programs are then loaded into SW 112, the processor may verify that the measurement of the program (e.g., as computed by the processor) is identical to the measurement previously embedded inside the program. The signature used to sign the embedded measurement is also verifiable because the processor may be provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, data may also be protected in TEE module 106. For example, known-good programs in SW 112 may encrypt data such as keys, passwords, licenses, etc. so that only verified good programs may decrypt this data. In at least one embodiment wherein SGX is being employed, SW 112 may be a Secure Enclave and SWDS 114 may be a SIGSTRUCT data structure. A SIGSTRUCT data structure may comprise information about an enclave from the enclave signer including, for example, an enclave hash as SHA256 and four 3072-bit integers (e.g., MODULUS, SIGNATURE, Q1 and Q2). While an RSA signature may not require Q1 and Q2, these integer values may be employed to accelerate signature verification. Consistent with the present disclosure, some or all of the contents of the SIGSTRUCT data structure may be repurposed to hold other information (e.g., a public key) as will be described in regard to FIG. 3.

In an example of operation, client module 106 in client device 102 may interact with SW configurator 108 to establish SWDS 114. The interaction may include, for example, determining a hash for an original version of SW 112 contained in SW configurator 108, generating a public key and a corresponding private key, placing the hash of SW 112 and a copy of the public key in SWDS 114 and transmitting SWDS 114 to SW configurator 108. In at least one embodiment, the hash of SW 112 may be determined by SW configurator 108 and transmitted to client module 106. The public and private keys may be generated in accordance with public key cryptographic methods including, for example, RSA, Diffie-Hellman, Digital Signature Algorithm (DSA), etc. SWDS 114 may be signed by the private key prior to transmission to remote resource 104. The private/public key pair may represent the customer (e.g., client device 102) or SW 112 based on, for example, the preference of the customer. When EC 110 is generated in remote resource 104, SW configurator 108 may cause SWDS 114 to be placed into EC 110 (e.g., in addition to other administrative credentials). EC 110 may then utilize SWDS 114 when initializing SW 112. In at least one embodiment, during initialization a hash may be determined over the public key in SWDS 114, the hash of the public key being important when determining an owner for SW 112.

Client module 106 may then attempt to claim ownership of SW 112, which may include client module 106 causing device 102 to transmit a request for ownership of SW 112 to remote resource 104. The request may be signed using the private key and may include a copy of the public key. In at least one embodiment, the request may be received in EC 110 by ownership determination module 116. Ownership determination module 116 may then, for example, verify the signature on the request using the public key received with the request and may determine if the public key that was received with the request is the same public key included in SWDS 114. If the keys are determined to match, then ownership determination module 116 may grant the request for ownership. Client module 106 may then be informed that it is the owner of SW 112 and may be able to access SW 112. It is important to note that while ownership determination module 116 is shown as residing within SW 112, it is also possible for ownership determination module 116 to reside elsewhere within EC 110 or even elsewhere within remote resource 104.

Figure 2:
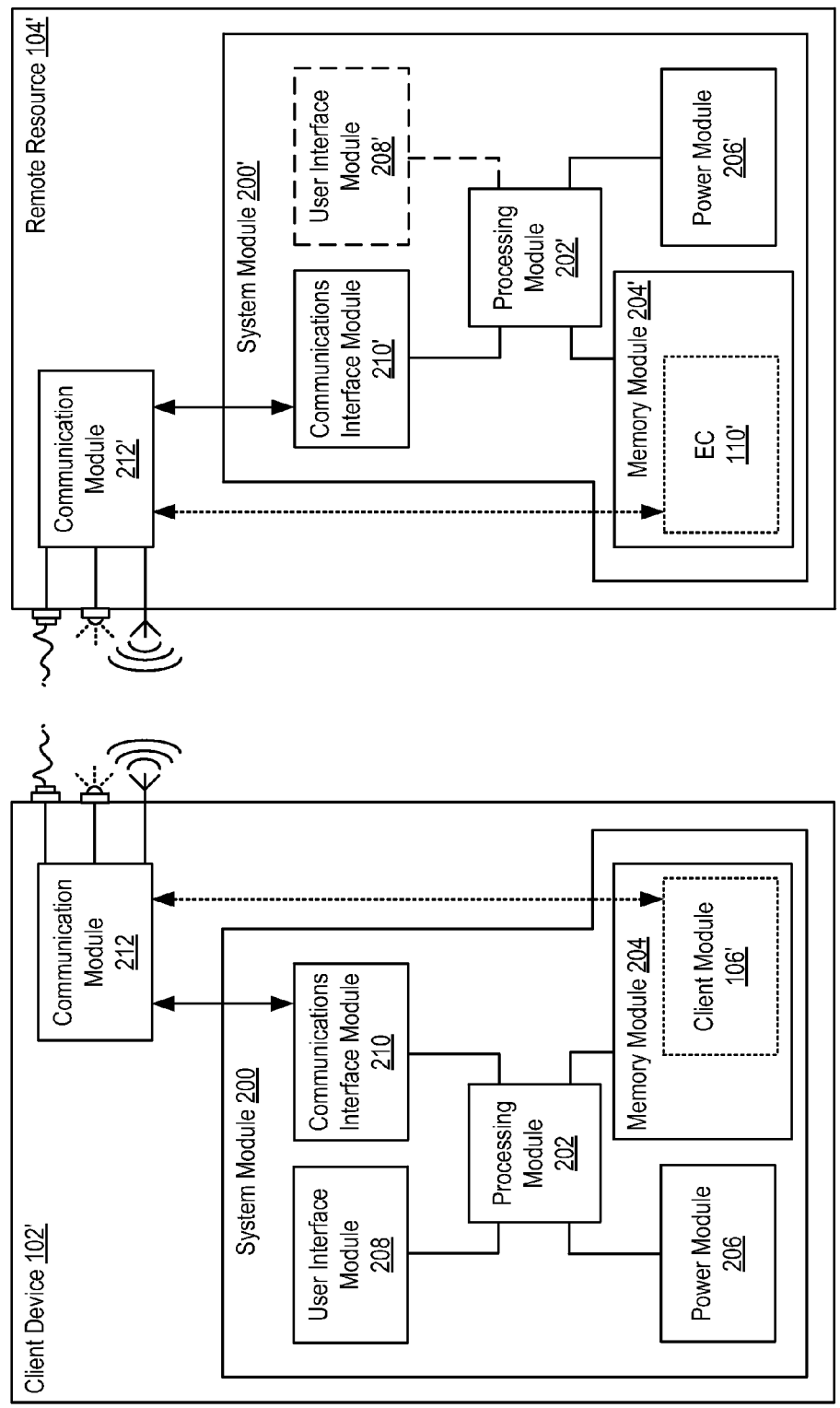
FIG. 2 illustrates example configurations for a client device and at least one device making up a remote resource usable in accordance with at least one embodiment of the present disclosure.

FIG. 2 illustrates example configurations for client device 102 and at least one device making up a remote resource 104 usable in accordance with at least one embodiment of the present disclosure. In particular, client device 102' and/or remote resource 104' may be capable of performing example functionality such as disclosed in FIG. 1. However, client device 102' and remote resource 104' are meant only as examples of apparatuses that may be usable in embodiments consistent with the present disclosure, and are not meant to limit these various embodiments to any particular manner of implementation.

Client device 102' may comprise, for example, system module 200 configured to manage device operations. System module 200 may include, for example, processing module 202, memory module 204, power module 206, user interface module 208 and communication interface module 210. Client device 102' may also include communication module 212. While communication module 212 has been illustrated as separate from system module 200, the example implementation shown in FIG. 2 has been provided merely for the sake of explanation. Some or all of the functionality associated with communication module 212 may be incorporated into system module 200.

In client device 102', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in client device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in client device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of client device 102' such as, for example, static RAM (SRAM) or Dynamic RAM (DRAM). ROM may include non-volatile (NV) memory modules configured based on BIOS, UEFI, etc. to provide instructions when client device 102' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply client device 102' with the power needed to operate. User interface module 208 may include hardware and/or software to allow users to interact with client device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 208 may be incorporated within client device 102' and/or may be coupled to client device 102' via a wired or wireless communication medium.

Communication interface module 210 may be configured to manage packet routing and other control functions for communication module 212, which may include resources configured to support wired and/or wireless communications. In some instances, client device 102' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, memory module 204 may comprise at least part of client module 106'. It may also be possible for client module 106' to comprise a hardware-based portion that may collaborate with executables and/or data loaded into memory module 204. In at least one embodiment, Client module 106' may interact with communication module 212 via the modules and/or buses described above. As part of this interaction, client module 106' may cause communication module 212 to transmit information to, and/or receive information from, remote resource 104'. Remote resource 104' is disclosed as a single device, but may in actuality be a plurality of devices configured to operate individually or in unison to process data, such as in the instance of a cloud-computing architecture. Remote resource 104' may comprise modules 200' to 212' corresponding to module 200 to 212, respectively, as disclosed in regard to client device 102', and as a result, these two groups of modules may be configured similarly and/or perform similar functionality. Some differences may typically exist in configuration between client device 102' and remote resource 104' wherein, for example, user interface module 210' may be optional in that a data server (e.g., mounted in a rack configuration) may not comprise user interface equipment and may instead rely upon a remote client station for user interface functionality. In at least one embodiment, memory module 204' may comprise EC 110'. EC 110' may be able to interact with communication module 212' via the modules and/or buses disclosed above, and may cause communication module 212' to receive information from, and/or transmit information to, client module 106' via communication module 212 in client device 102'.

Figure 3:
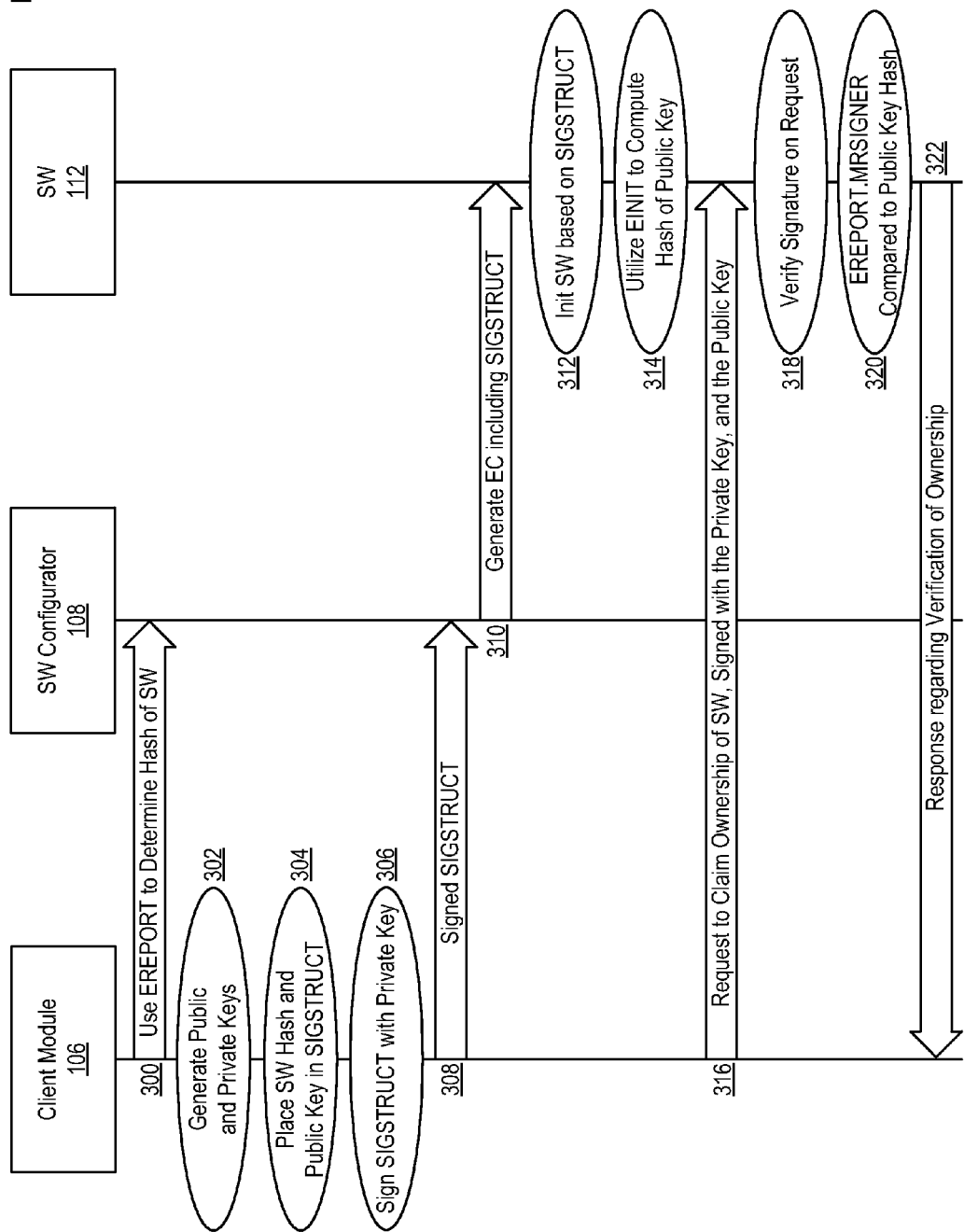
FIG. 3 illustrates example interaction that may occur between a client module, a secure workspace configurator and a secure workspace in accordance with at least one embodiment of the present disclosure.

FIG. 3 illustrates example interaction that may occur between client module 106, SW configurator 108 and SW 112 in accordance with at least one embodiment of the present disclosure. Initially, while the example interaction disclosed in FIG. 3 may reference various terminology, structures, methodologies, etc. associated with SGX technology, embodiments consistent with the present disclosure are not limited to implementation only using SGX. The embodiments disclosed herein may also be implemented using alternative security technologies. As shown at 300, client module 106 may employ an instruction (e.g., the SGX EREPORT instruction) to determine a hash of SW 112. The hash may be measured from an "original" SW 112 utilized as a "master" in SW configurator 108 to generate SW 112 in EC 110. The actual determination of the hash may be performed by client module 106 or SW configurator 108 and then transmitted to client module 106. Client module 106 may then generate public and private keys as shown at 302, a copy of the public key and the previously determined hash of SW 112 being placed into SWDS 114 (e.g., a SGX SIGSTRUCT data structure) as shown at 304. At 306, the SIGSTRUCT may be signed by client module 106 using the private key and then transmitted to SW configurator 108 at 308. When EC 110 is generated, SW configurator 108 may place a copy of the SIGSTRUCT into EC 110 at 310. EC 110 may then initialize SW 112 based on the SIGSTRUCT at 312, wherein initialization may include computing a hash (e.g., using the SGX EINIT instruction) of the public key placed in the SIGSTRUCT by client module 106 at 314.

When claiming ownership of SW 112, client module 106 may cause client device 102 to transmit a request to claim ownership of SW 112, signed by the private key, along with a copy of the public key as shown at 316. At 318, SW 112, and more particularly ownership determination module 116, may initially verify the signature on the request to claim ownership received from client module 106 using the public key provided along with the request. If the signature is valid, SW 112 may then employ an instruction (e.g., the SGX EREPORT instruction) to determine the hash of the public key that was previously stored in the SIGSTRUCT, may determine a hash for the public key provided along with the request and may then compare the hash of the public key provided along with the request to the previously determined hash of the public key in the SIGSTRUCT at 320. In at least one example implementation, the hash value of the public key in at least one field within the SIGSTRUCT may be placed into EREPORT.MRSIGNER by SW 112 (e.g., the SGX hardware supporting SW 112). The value of EREPORT.MRSIGNER may then be compared to the hash of the public key received with the ownership request to determine ownership of SW 112. If the hashes are determined to match, SW 112 may then advise client module 106 that ownership of SW 112 by client module 106 has been verified at 322.

Figure 4:
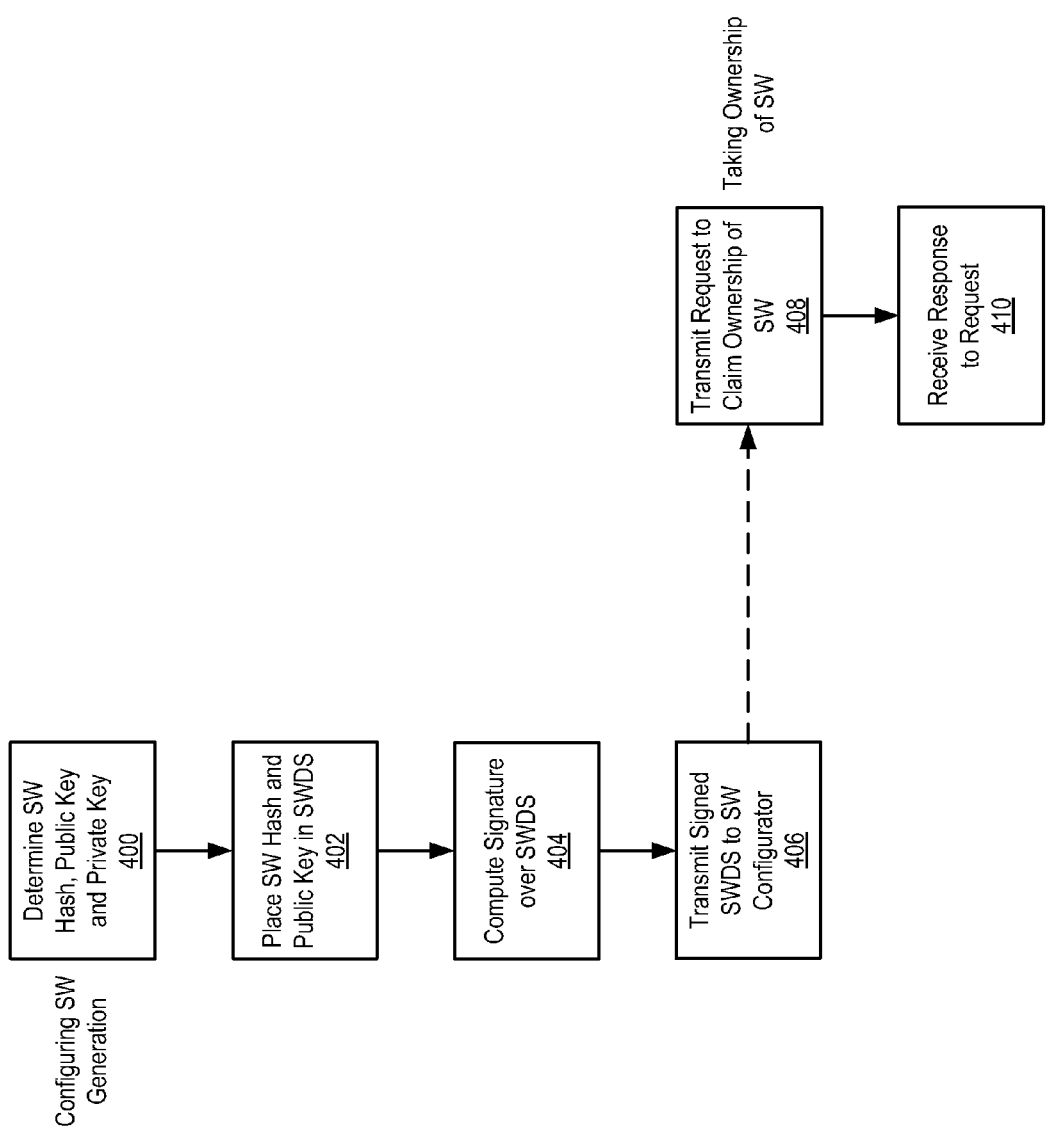
FIG. 4 illustrates example operations for establishing ownership of a secure workspace from the perspective of a client device in accordance with at least one embodiment of the present disclosure.

FIG. 4 illustrates example operations for establishing ownership of a secure workspace from the perspective of a client device in accordance with at least one embodiment of the present disclosure. Example operations 400 to 406 may generally pertain to configuring SW generation. Initially, in operation 400 a hash of a trusted SW (e.g., a SW to which ownership will later be claimed) is determined along with public and private keys. The SW hash and public key may then be placed into a SWDS in operation 402. A signature may be computed over the SWDS in operation 404 (e.g., utilizing the private key) and the signed SWDS may be transmitted (e.g., to an SW configurator) in operation 406. Example operations 408 and 410 may generally pertain to taking ownership of a SW. In operation 408 a request for ownership of a SW may be transmitted (e.g., to a remote resource comprising the SW). In operation 410, a response to the request may be received. For example, the response to the request may indicate that the request was verified and the requestor is the owner of the SW (e.g., may be able to access the SW), or alternatively, that the request could not be verified and that the requestor is not permitted to access the SW.

FIG. 5 illustrates example operations for establishing ownership of a secure workspace from the perspective of a remote resource in accordance with at least one embodiment of the present disclosure. Example operations 500 to 504 may generally pertain to generating a SW in a remote resource. In operation 500, a SWDS may be received (e.g., in a SW configurator). An EC may then be generated including the SWDS in operation 502. The EC may then initialize the SW utilizing the SWDS in operation 504. In at least one embodiment, initialization of the SW may comprise determining a hash for a public key included within the SWDS. Example operations 506 to 516 may generally pertain to verifying ownership of a SW. In operation 506 a request may be received to claim ownership of a SW along with a public key. The request may be signed, and in operation 508 the signature of the request may be verified using the public key provided along with the request. Provided that the signature is able to be verified in operation 508, in operation 510 a hash value may be determined at least for the public key received along with the request to claim ownership of the SW. A determination may then be made in operation 512 as to whether the hash of the public key received along with the request matches the hash of the public key that was received in the SWDS. If in operation the hashes are determined not to match, then in operation 514 the request to claim ownership of the SW may be denied. On the other hand, if the hashes are determined to match in operation 512, then in operation 516 the request to claim ownership of the SW may be granted. In at least one embodiment, the requestor may then be informed that the request was granted and access to the SW is now permitted.

While FIGS. 4 and 5 illustrate operations according to different embodiments, it is to be understood that not all of the operations depicted in FIGS. 4 and 5 are necessary for other embodiments. Indeed, it is fully contemplated herein that in other embodiments of the present disclosure, the operations depicted in FIGS. 4 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to establishing ownership of a secure workspace (SW). A client device may provide a SW data structure (SWDS) to a SW configurator. A SWDS may comprise a hash of an original SW and a public key, and may be signed by a private key corresponding to the public key. The SW configurator may cause an execution container (EC) to be generated including a SW initiated using the SWDS. The client device may claim SW ownership using a request (signed by the private key) transmitted along with a copy of the public key. SW ownership may be determined by an ownership determination module that verifies the signature of the request using the public key received with the request, determines a hash of the received public key and compares the hash of the received public key to a hash of the public key in the SWDS.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for establishing ownership of a secure workspace, as provided below.

According to example 1 there is provided at least one device. The at least one device may comprise a communication module to interact with at least a client device and a secure workspace configurator to receive a secure workspace data structure from the client device and cause a secure workspace to be included within an execution container generated by the remote resource, the secure workspace being based on the secure workspace data structure.

Example 2 may include the elements of example 1, wherein the secure workspace data structure comprises data pertaining to the secure workspace and a public key, the secure workspace data structure being received in a message signed with a private key corresponding to the public key.

Example 3 may include the elements of example 2, wherein the data pertaining to the secure workspace comprises a hash value measured from the secure workspace.

Example 4 may include the elements of any of examples 2 to 3, wherein the execution container is further to initialize the secure workspace based on the secure workspace data structure, initialization of the secure workspace including measuring a hash value of the public key in the secure workspace data structure.

Example 5 may include the elements of example 4, wherein the secure workspace further comprises an ownership determination module to receive a signed message including at least a request to take ownership of the secure workspace and the public key from the client device via the communication module and determine whether the client device is authorized to take ownership of the secure workspace based at least on the signed message and the secure workspace data structure.

Example 6 may include the elements of example 5, wherein the ownership determination module being to determine whether the client device is authorized to take ownership of the secure workspace comprises the ownership determination module being to verify the signature of the signed message utilizing the public key received with the signed message, determine a hash value for the public key received with the signed message by measuring the public key, verify ownership of the secure workspace by comparing the hash of the public key received with the signed message to the hash of the public key determined when the secure workspace was initialized and grant ownership of the secure workspace to the client device if the hash of the public key received with the signed message matches the hash of the public key determined when the secure workspace was initialized.

Example 7 may include the elements of example 6, wherein comparing the hash of the public key received with the signed message to the hash of the public key determined when the secure workspace was initialized comprises placing a hash value read from a field within a Software Guard Extensions (SGX) SIGSTRUCT data structure into an SGX EREPORT.MRSIGNER data structure, and comparing the value of the EREPORT.MRSIGNER to the hash of the public key received with the signed message.

Example 8 may include the elements of any of examples 1 to 7, wherein the secure workspace is a secure enclave based on Software Guard Extensions (SGX) technology and the secure workspace data structure is an SGX SIGSTRUCT data structure.

Example 9 may include the elements of any of examples 1 to 8, wherein the secure workspace data structure comprises a hash value measured from the secure workspace and a public key, the secure workspace data structure being received in a message signed with a private key corresponding to the public key.

Example 10 may include the elements of any of examples 1 to 9, wherein the at least one device is at least one server configured to operate in a cloud computing architecture.

Example 11 may include the elements of any of examples 1 to 10, wherein the execution container comprises a virtual machine.

According to example 12 there is provided a client device. The client device may comprise a communication module to interact with at least a remote resource and a client module to determine a hash value of a secure workspace by measuring an original version of the secure workspace to be used for generating new secure workspaces, generate a public key and a corresponding private key, place at least the hash value and the public key into a secure workspace data structure and transmit the secure workspace data structure to the remote resource.

Example 13 may include the elements of example 12, wherein the hash value of the secure workplace is received from a secure workplace configurator in the remote resource.

Example 14 may include the elements of any of examples 12 to 13, wherein the client module is further to generate a message comprising a request to take ownership of a secure workspace, sign the message with the private key and transmit the signed message and the public key to the remote resource.

Example 15 may include the elements of any of examples 12 to 14, wherein the secure workspace is a secure enclave based on Software Guard Extensions (SGX) technology and the secure workspace data structure is an SGX SIGSTRUCT data structure.

According to example 16 there is provided a method for establishing ownership of a secure workspace. The method may comprise receiving a secure workspace data structure at a secure workspace configurator from a client device, the secure workspace configurator residing in a remote resource and causing a secure workspace to be included within an execution container generated by the remote resource, the secure workspace being based on the secure workspace data structure.

Example 17 may include the elements of example 16, wherein the secure workspace data structure comprises data pertaining to the secure workspace and a public key, the secure workspace data structure being received in a message signed with a private key corresponding to the public key.

Example 18 may include the elements of any of examples 16 to 17, wherein the data pertaining to the secure workspace comprises a hash value measured from the secure workspace.

Example 19 may include the elements of example 18, and may further comprise initializing the secure workspace based on the secure workspace data structure, wherein initializing the secure workspace includes measuring a hash value of the public key in the secure workspace data structure.

Example 20 may include the elements of example 19, and may further comprise receiving a signed message including at least a request to take ownership of the secure workspace and the public key from the client device and determining whether the client device is authorized to take ownership of the secure workspace based at least on the signed message and the secure workspace data structure.

Example 21 may include the elements of example 20, wherein determining whether the client device is authorized to take ownership of the secure workspace may comprise verifying the signature of the signed message utilizing the public key received with the signed message, determining a hash value for the public key received with the signed message by measuring the public key, verifying ownership of the secure workspace by comparing the hash of the public key received with the signed message to the hash of the public key determined when the secure workspace was initialized and grant ownership of the secure workspace to the client device if the hash of the public key received with the signed message matches the hash of the public key determined when the secure workspace was initialized.

Example 22 may include the elements of example 21, wherein comparing the hash of the public key received with the signed message to the hash of the public key determined when the secure workspace was initialized comprises placing a hash value read from a field within a Software Guard Extensions (SGX) SIGSTRUCT data structure into an SGX EREPORT.MRSIGNER data structure, and comparing the value of the EREPORT.MRSIGNER to the hash of the public key received with the signed message.

Example 23 may include the elements of any of examples 16 to 22, wherein the secure workspace is a secure enclave based on Software Guard Extensions (SGX) technology and the secure workspace data structure is an SGX SIGSTRUCT data structure.

Example 24 may include the elements of any of examples 16 to 23, wherein the secure workspace data structure comprises a hash value measured from the secure workspace and a public key, the secure workspace data structure being received in a message signed with a private key corresponding to the public key.

Example 25 may include the elements of any of examples 16 to 24, wherein the remote resource comprises at least one server configured to operate in a cloud computing architecture.

Example 26 may include the elements of any of examples 16 to 25, wherein the execution container comprises a virtual machine.

According to example 27 there is provided a method for claiming ownership of a secure workspace. The method may comprise determining a hash value of a secure workspace in a remote resource by measuring an original version of the secure workspace to be used for generating new secure workspaces, generating a public key and a corresponding private key, placing at least the hash value and the public key into a secure workspace data structure and transmitting the secure workspace data structure to the remote resource.

Example 28 may include the elements of example 27, wherein the hash value of the secure workplace is received from a secure workplace configurator in the remote resource.

Example 29 may include the elements of any of examples 27 to 28, and may further comprise generating a message comprising a request to take ownership of a secure workspace, signing the message with the private key and transmitting the signed message and the public key to the remote resource.

Example 30 may include the elements of any of examples 27 to 29, wherein the secure workspace is a secure enclave based on Software Guard Extensions (SGX) technology and the secure workspace data structure is an SGX SIGSTRUCT data structure.

According to example 31 there is provided a system including at least a device and a remote resource, the system being arranged to perform the method of any of the above examples 16 to 30.

According to example 32 there is provided a chipset arranged to perform the method of any of the above examples 16 to 30.

According to example 33 there is provided at least one machine readable medium comprising a plurality of instructions that, in response to be being executed on a computing device, cause the computing device to carry out the method according to any of the above examples 16 to 30.

According to example 34 there is provided a device configured for establishing ownership of a secure workspace, the device being arranged to perform the method of any of the above examples 16 to 30.

According to example 35 there is provided a system for establishing ownership of a secure workspace. The system may comprise means for receiving a secure workspace data structure at a secure workspace configurator from a client device, the secure workspace configurator residing in a remote resource and means for causing a secure workspace to be included within an execution container generated by the remote resource, the secure workspace being based on the secure workspace data structure.

Example 36 may include the elements of example 35, wherein the secure workspace data structure comprises data pertaining to the secure workspace and a public key, the secure workspace data structure being received in a message signed with a private key corresponding to the public key.

Example 37 may include the elements of example 36, wherein the data pertaining to the secure workspace comprises a hash value measured from the secure workspace.

Example 38 may include the elements of any of examples 36 to 37, and may further comprise means for initializing the secure workspace based on the secure workspace data structure, wherein initializing the secure workspace includes measuring a hash value of the public key in the secure workspace data structure.

Example 39 may include the elements of example 38, and may further comprise means for receiving a signed message including at least a request to take ownership of the secure workspace and the public key from the client device and means for determining whether the client device is authorized to take ownership of the secure workspace based at least on the signed message and the secure workspace data structure.

Example 40 may include the elements of example 39, wherein the means for determining whether the client device is authorized to take ownership of the secure workspace comprise means for verifying the signature of the signed message utilizing the public key received with the signed message, determining a hash value for the public key received with the signed message by measuring the public key, verifying ownership of the secure workspace by comparing the hash of the public key received with the signed message to the hash of the public key determined when the secure workspace was initialized and granting ownership of the secure workspace to the client device if the hash of the public key received with the signed message matches the hash of the public key determined when the secure workspace was initialized.

Example 41 may include the elements of any of examples 36 to 40, wherein the secure workspace is a secure enclave based on Software Guard Extensions (SGX) technology and the secure workspace data structure is an SGX SIGSTRUCT data structure.

According to example 42 there is provided a system for claiming ownership of a secure workspace. The system may comprise means for determining a hash value of a secure workspace in a remote resource by measuring an original version of the secure workspace to be used for generating new secure workspaces, means for generating a public key and a corresponding private key, means for placing at least the hash value and the public key into a secure workspace data structure and means for transmitting the secure workspace data structure to the remote resource.

Example 43 may include the elements of example 42, wherein the hash value of the secure workplace is received from a secure workplace configurator in the remote resource.

Example 44 may include the elements of any of examples 42 to 43, and may further comprise means for generating a message comprising a request to take ownership of a secure workspace, means for signing the message with the private key and means for transmitting the signed message and the public key to the remote resource.

Example 45 may include the elements of any of examples 42 to 44, wherein the secure workspace is a secure enclave based on Software Guard Extensions (SGX) technology and the secure workspace data structure is an SGX SIGSTRUCT data structure.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. At least one device, comprising:
communication circuitry to interact with at least a client device; and
secure workspace configurator circuitry to:
receive a secure workspace data structure from the client device; wherein the secure workspace is a secure enclave and wherein the secure workspace data structure includes enclave hash information concerning the secure enclave, the enclave hash information being generated by a signor of the secure enclave;
generate an execution container, wherein the execution container is to initialize the secure workspace based on the secure workspace data structure, initialization of the secure workspace including measuring a hash value of a public key in the secure workspace data structure; and
cause a secure workspace including at least one executable program to be included within the execution container, wherein the secure workspace stores at least a portion of the secure workspace data structure received from the client device, wherein the secure workspace data structure comprises data pertaining to the secure workspace and the public key, wherein the secure workspace further comprises ownership determination circuitry to:
receive a signed message including at least a request to take ownership of the secure workspace and the public key from the client device via the communication circuitry; and
determine whether the client device is authorized to take ownership of the secure
workspace based at least on the signed message and the secure workspace data structure,
wherein the ownership determination circuitry to determine whether the client device is authorized to take ownership of the secure workspace comprises the ownership determination circuitry being to further:
verify the signature of the signed message utilizing the public key received with the signed message;
determine a hash value for the public key received with the signed message by measuring the public key;
verify ownership of the secure workspace by comparing the hash of the public key received with the signed message to the hash of the public key determined when the secure workspace was initialized; and
grant ownership of the secure workspace to the client device if the hash of the public key received with the signed message matches the hash of the public key determined when the secure workspace was initialized.

2. The at least one device of claim 1, wherein the secure workspace data structure being received in a message signed with a private key corresponding to the public key.

3. The at least one device of claim 2, wherein the data pertaining to the secure workspace comprises a hash value measured from the secure workspace.

4. The at least one device of claim 1, wherein the secure workspace is a secure enclave based on Software Guard Extensions (SGX) technology and the secure workspace data structure is an SGX SIGSTRUCT data structure.

5. A method for establishing ownership of a secure workspace, comprising:
receiving, from a client device, a secure workspace data structure at secure workspace configurator circuitry in a remote resource; wherein the secure workspace is a secure enclave and wherein the secure workspace data structure includes enclave hash information concerning the secure enclave, the enclave hash information being generated by a signor of the secure enclave, wherein the secure workspace data structure comprises data pertaining to the secure workspace and a public key, the secure workspace data structure being received in a message signed with a private key corresponding to the public key;
causing secure workspace configurator circuitry to generate an execution container on the remote resource;
causing the secure workspace configurator circuitry to generate a secure workspace including at least one executable program within the execution container;
storing at least a portion of the secure workspace data structure received from the client device in the secure workspace;
initializing, by the execution container, the secure workspace based on the secure workspace data structure, wherein initializing the secure workspace includes measuring a hash value of the public key in the secure workspace data structure;

receiving a signed message including at least a request to take ownership of the secure workspace and the public key from the client device; and determining whether the client device is authorized to take ownership of the secure workspace based at least on the signed message and the secure workspace data structure; and wherein determining whether the client device is authorized to take ownership of the secure workspace comprises:

verifying the signature of the signed message utilizing the public key received with the signed message;

determining a hash value for the public key received with the signed message by measuring the public key;

verifying ownership of the secure workspace by comparing the hash of the public key received with the signed message to the hash of the public key determined when the secure workspace was initialized; and granting ownership of the secure workspace to the client device if the hash of the public key received with the signed message matches the hash of the public key determined when the secure workspace was initialized.

6. The method of claim 5, wherein the data pertaining to the secure workspace comprises a hash value measured from the secure workspace.

7. The method of claim 5 wherein the secure workspace is a secure enclave based on Software Guard Extensions (SGX) technology and the secure workspace data structure is an SGX SIGSTRUCT data structure.

8. At least one non-transitory, machine-readable, storage medium having stored thereon, individually or in combination, instructions for establishing ownership of a secure workspace that, when executed by one or more processors, cause the one or more processors to:

receive, from a client device, a secure workspace data structure at a secure workspace configurator circuitry in a remote resource; wherein the secure workspace is a secure enclave and wherein the secure workspace data structure includes enclave hash information concerning the secure enclave, the enclave hash information being generated by a signor of the secure enclave, wherein the secure workspace data structure comprises data pertaining to the secure workspace and a public key, the secure workspace data structure being received in a message signed with a private key corresponding to the public key;

cause secure workspace configurator circuitry to generate an execution container on the remote resource;

cause the secure workspace configurator circuitry to generate a secure workspace including at least one executable program within the execution container; and storing at least a portion of the secure workspace data structure received from the client device in the secure workspace;

initialize, by the execution container, the secure workspace based on the secure workspace data structure, wherein initializing the secure workspace includes measuring a hash value of the public key in the secure workspace data structure;

receive a signed message including at least a request to take ownership of the secure workspace and the public key from the client device;

determine whether the client device is authorized to take ownership of the secure workspace based at least on the signed message and the secure workspace data structure;

verify the signature of the signed message utilizing the public key received with the signed message;

determine a hash value for the public key received with the signed message by measuring the public key;

verify ownership of the secure workspace by comparing the hash of the public key received with the signed message to the hash of the public key determined when the secure workspace was initialized; and grant ownership of the secure workspace to the client device if the hash of the public key received with the signed message matches the hash of the public key determined when the secure workspace was initialized.

9. The medium of claim 8, wherein the data pertaining to the secure workspace comprises a hash value measured from the secure workspace.

10. The medium of claim 8, wherein the secure workspace is a secure enclave based on Software Guard Extensions (SGX) technology and the secure workspace data structure is an SGX SIGSTRUCT data structure.

* * * * *